US005503247A

United States Patent [19]
MacLeod

[11] Patent Number: 5,503,247
[45] Date of Patent: Apr. 2, 1996

[54] PALLET LEVEL LOADER

[75] Inventor: Ian C. MacLeod, Saco, Me.

[73] Assignee: Southworth Products Corp., Portland, Me.

[21] Appl. No.: 282,206

[22] Filed: Jul. 28, 1994

[51] Int. Cl.⁶ ........................................ B86B 9/16
[52] U.S. Cl. .............................. 187/240; 187/253
[58] Field of Search ............................ 187/222, 231, 187/240, 244, 253, 207

[56] References Cited

U.S. PATENT DOCUMENTS 4,331,219  5/1982  Suzuki ............................ 187/207
4,684,310  8/1987  Stange ............................ 187/207
4,741,414  5/1988  Claassen .......................... 187/18

Primary Examiner—Kenneth Noland
Attorney, Agent, or Firm—Kenway & Crowley

[57]  ABSTRACT

Pallet loading apparatus including a three-sided enclosure open at top and bottom in which a cantilver-supported lifting platform is vertically reciprocable and driven by a hydraulic system housed in the rear wall of the enclosure, the rear wall being comprised of relatively widely spaced panels and the side walls being relatively narrow. The platform may be locked in position at a predetermined height within the three-sided enclosure to permit its movement from place to place by a hand pallet jack or forklift.

5 Claims, 3 Drawing Sheets

PALLET LEVEL LOADER

BACKGROUND OF THE INVENTION

This invention relates in general to pallet loading and unloading equipment and in particular to apparatus for raising pallets to a convenient height for the loading and unloading of goods by operators.

It is customary in moving and warehousing operations to utilize wooden pallets on which goods are stacked in tiers. The loaded pallets may then be moved from place to place by means of hand pallet trucks or forklifts. The pallets take the form of platforms having two separated horizontal surfaces with an open area between the two surfaces in which the forklift or pallet jack may be inserted. In use, the top surface of the pallet is conventionally about 6" above the floor level and the first tier or layer of goods stacked on the pallet requires that the worker bend from the waist or stoop to load or unload the goods in that tier. The repeated bending or stooping accompanied by lifting of materials, particularly heavy materials, inevitably results in worker fatigue, strain, and, frequently, injury. Another common problem involved in palletized shipping or warehousing is the tendency of some materials when stacked to slide off the pallet or off lower tiers on which they are placed. Some restraint such as an enclosing wall about the pallet to retain goods in place in the tiers would avoid such slippage.

The problems outlined have been avoided to some extent by automating the processes and in some cases by resorting to robot loading machines or apparatus. Such expedients are inordinately expensive, however, and are usually highly specialized in that each job must be individually and specifically addressed to provide a customized solution.

There has been also been developed a pallet-loading device which utilizes a cradle vertically movable in an enclosure and having a scissors-jack lifting mechanism in each opposing side of the three-sided enclosure. This device has achieved some acceptance, but has been found objectionable because of the width of the side walls necessitated by the inclusion therein of the scissors-jack type lifting mechanism. Wide side walls are inconvenient and somewhat hazardous to operators who must reach and stretch to reach over such walls to handle goods. Moreover, the two scissors-type jacks utilized must be in synchronized operation for smooth lifting of the pallet and goods. Where hydraulic power is used, some provision must be made to equalize the flow of hydraulic fluid. Generally, a flow divider or similar accessory is required in the hydraulic circuit which adds to the complexity and cost of the equipment.

A primary object of the present invention is the provision of a simple universally applicable device for positioning pallets at a convenient height for loading and unloading by a worker.

Another object of the present invention is to provide an open-topped three-sided enclosure in which tiers of goods stacked on a pallet may be prevented from spilling or sliding from the pallet or from the lower tiers of material, A further object of the present invention is the provision of a pallet lift apparatus in which the working height is adjustable by the use of conveniently located controls.

A still further object of the present invention is a pallet-loading apparatus which is easily movable from place to place by means of a hand pallet truck or forklift.

Yet another object of the present invention is a pallet lift apparatus in which the lift platform is a cantilever support structure, the operating mechanism for which is housed in an end wall, the side walls of the housing being conveniently narrow to minimize equipment size to protect workers from hazards.

SUMMARY OF THE INVENTION

The present invention is organized about a three-sided enclosure open at top and bottom and having no front wall, whereby access to the interior of the enclosure may be had by a forklift or hand pallet truck.

Within the enclosure is a hydraulic-powered vertically-reciprocable platform cantilever supported from the closed end which forms the rear wall of the enclosure. The rear wall includes two spaced parallel panels which are joined to form a compartment for an electrically controlled hydraulic unit. The hydraulic unit includes a retractable piston carrying a sheave over which the chain of a hoist passes. The chain hoist is connected by a central cantilever support to the reciprocable platform.

The chain hoist driven by a single hydraulic piston provides linear travel of the platform with unvarying hydraulic pressure irrespective of the load on the platform. Also, the chain hoist, unlike the scissors arrangement of the prior art, has a two-to-one mechanical advantage in that the travel of the platform is twice that of the hydraulic piston.

An easily accessible foot switch permits an operator to adjust smoothly the height of the platform to afford convenient loading or unloading of palletized goods carried by the platform. The use of relatively narrow side walls further facilitates loading and unloading operations by minimizing reaching and stretching by the operator. Also, the platform may be locked to the housing to permit movement of the entire apparatus from place to place using a pallet jack or a forklift.

For a better understanding of the present invention, together with other and further objects, features and advantages, reference should be made to the following description of a preferred embodiment which should be read with reference to the appended drawing in which:

DESCRIPTION OF PREFERRED EMBODIMENT

Figure 1:
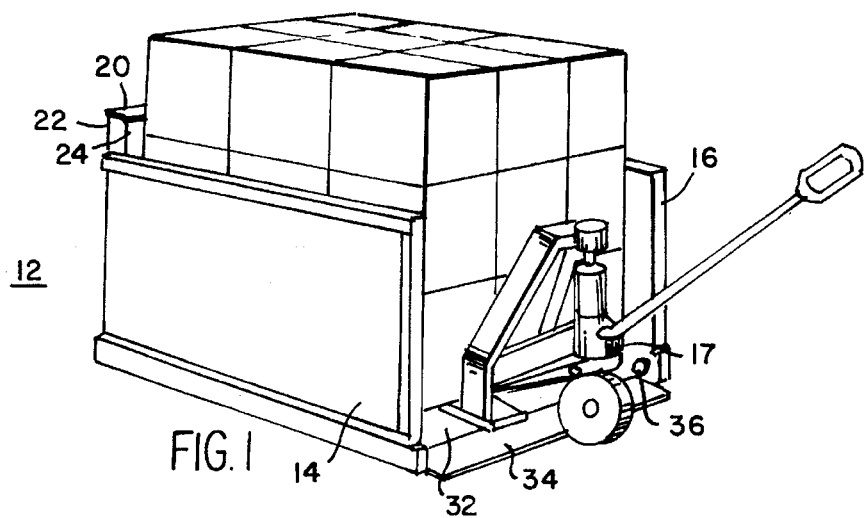
FIG. 1 is a perspective view of a preferred model of invention in use with stacked palletized goods and a hand pallet truck.

In FIG. 1, the loading apparatus 12 may be seen to include a three-sided enclosure open at top and bottom. Two relatively thin walls 14 and 16 are connected at their ends by a relatively thick rear wall 20 comprised of two spaced panels 22 and 24. As is explained in greater detail hereinbelow, the spaced panels 22 and 24 are joined at top, bottom and sides to form a housing or compartment for a hydraulic lift mechanism which is electrically controlled to raise and lower a vertically reciprocable platform 32 within the enclosure. Also visible in this view is a toe guard 34 fixed to the front edge of the platform 32 and preferably made of a soft elastomeric material to aid operators in avoiding crushing action by the descending platform. A further or alternative safety feature is a photoelectric cell 36 which is in the path of a light beam which parallels the toe guard and disables the lift mechanism when the beam is interrupted as, for example, by the descending platform or an operator's foot, as explained in greater detail hereinbelow.

In FIG. 1, the lift platform 32 is at the low end of its travel and carries a pallet and three tiers of goods. The topmost tier is at a height convenient for unloading by an operator.

Figure 2:
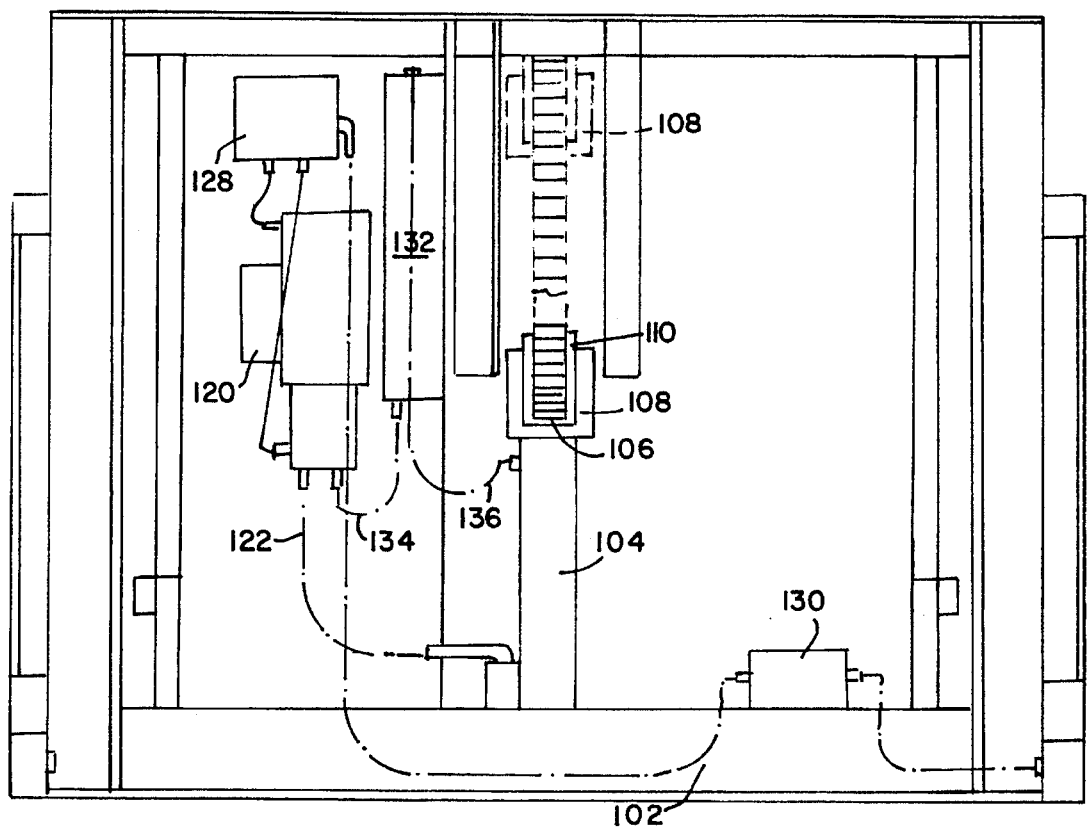
FIG. 2 is an elevation of the rear wall of the enclosure within which the operating mechanism of the apparatus is housed.
Figure 2A:
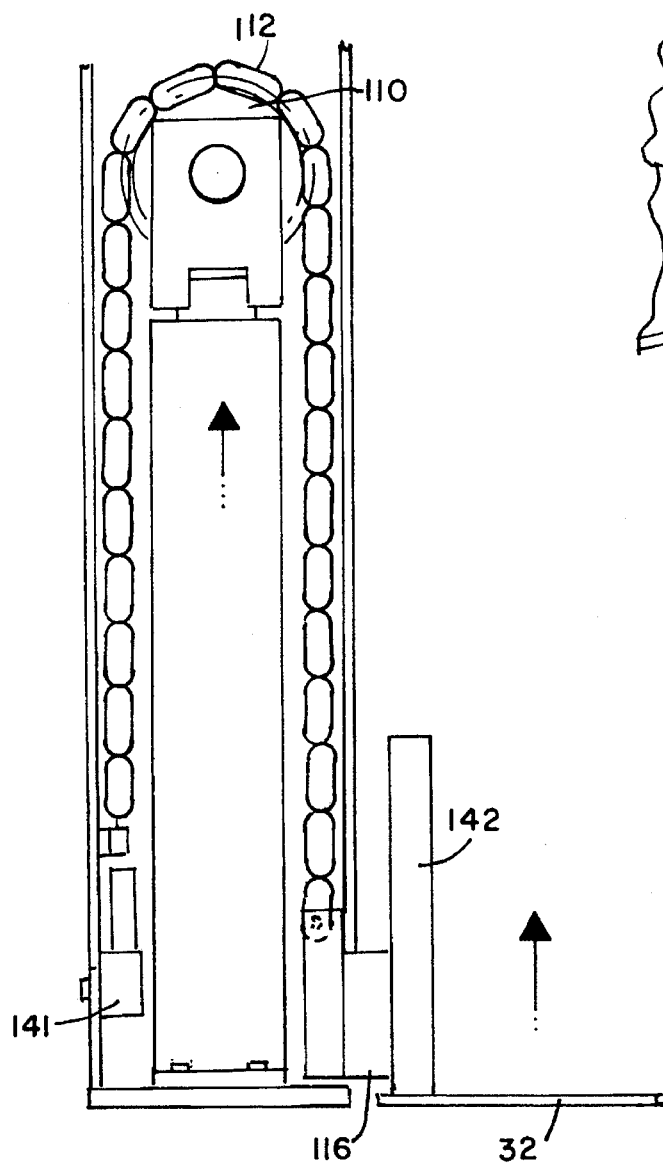
FIG. 2A is a view partly in section of the chain hoist and hydraulic cylinder which raise and lower the lift platform of the apparatus.

FIG. 2 is a rear elevation of a preferred embodiment of the invention. To permit viewing of the lift mechanism, the outer panel 22 of the back wall has been removed. Between that panel and the inner matching panel 24 which together form the back wall of the equipment, a compartment is formed in which the lifting mechanism is disposed. The compartment is internally framed and contains a hydraulic lift circuit and mechanism of conventional and well-known design. It includes a hydraulic cylinder 104 mounted on a bottom frame member 102. The hydraulic cylinder 104 includes a reciprocal piston 106 on which is mounted a sheave support 108. A sheave 110 is mounted for rotation in the sheave support 108. The piston, the sheave and sheave support are shown in full lines in their retracted position. They are shown in dotted lines in their fully extended position. As best seen in FIG. 2A, a leaf chain 112 passes over the sheave 110. One end of the chain 112 is firmly bolted to the housing frame member 102 at 114. The other end of the chain 112 is attached to a cantilever platform lift member 116.

A hydraulic power unit 120 pumps hydraulic fluid to the hydraulic cylinder 104 by way of the high pressure line 122. A reservoir of hydraulic fluid 132 is connected in the fluid circuit with the hydraulic power unit 120 and the hydraulic cylinder by means of tubing 134 and 136. The hydraulic power unit 120 is controlled by an electrical controller 128. The electrical controller 128 is operable by a foot or hand-controlled switch 130 as well as in response to a photoelectric eye as explained in greater detail elsewhere herein.

Again referring to FIG. 2A, there may be seen fragmentarily the platform 32 having an upstanding end member 142. Members similar to the end member 142 also are joined to the sides of the platform to form a cradle-like unit in which a pallet and goods may be retained as shown in FIG. 1. Generally, the height of the side and end members is such that the first tier of goods stacked on the pallet may be restrained from sliding or slipping from the pallet.

Figure 3A:
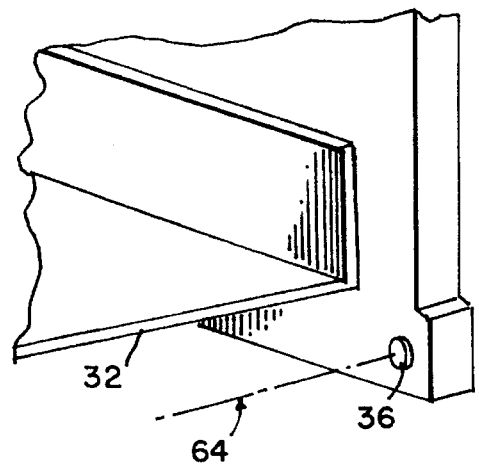
FIG. 3A is a fragmentary view of a corner of the three-sided enclosure.
Figure 3:
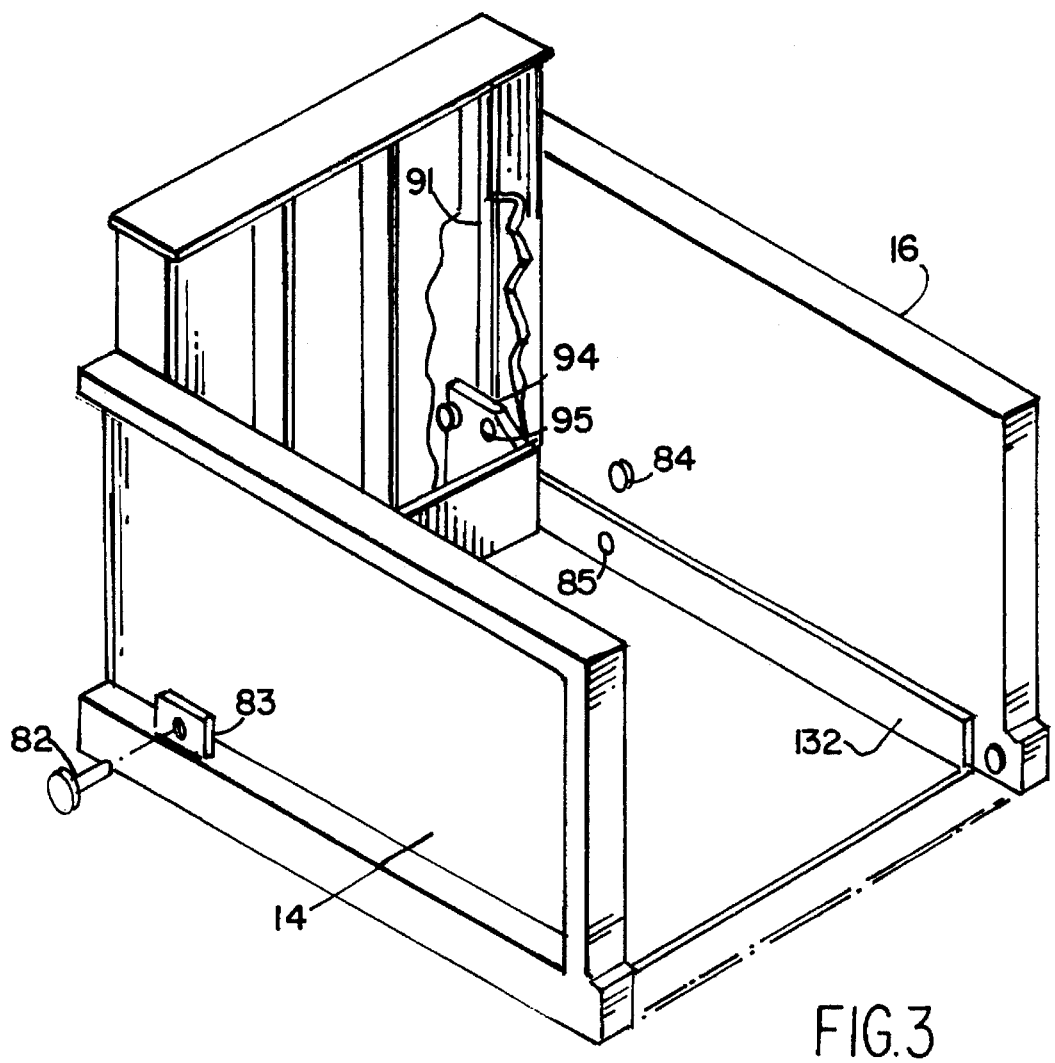
FIG. 3 is a perspective view of the three-sided enclosure utilized in the apparatus.
Figure 3B:
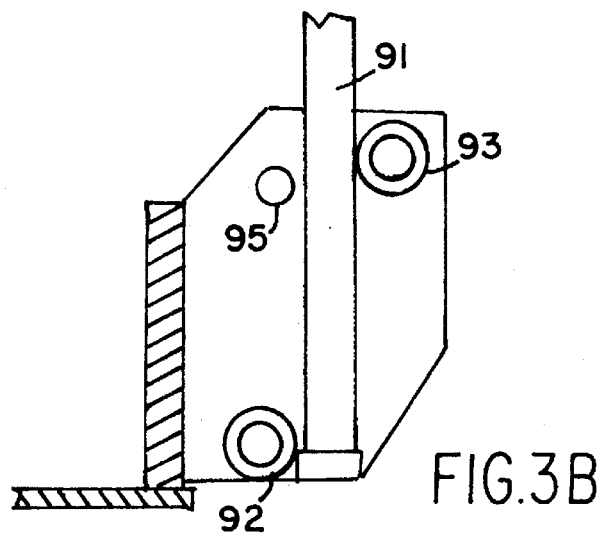
FIG. 3B is a fragmentary view of the platform guide and lock system.

In FIGS. 3 and 3B, detail is shown of the mechanism used to move the loading apparatus from place to place by a hand pallet truck or forklift. Two locking pins pass through the mounting blocks on the enclosure wall adjacent the rear corners of the lift platform 32. Visible in FIG. 3 are the pin 82 and the mounting block 83 on the wall 14. A similar juxtaposed arrangement of pin and block are on wall 16, and the interior opening for that pin may be seen at 84. An opening 85 in the side member 132 is so placed that when the platform 32 reaches a height where a locking pin can pass through the openings 84 and 85, a pallet may be slid beneath the lift platform 32. The pallet may then be engaged by a forklift or a pallet jack in the conventional manner and the entire apparatus may be moved as desired from place to place.

To insure smooth vertical movement and maintenance of the platform in a horizontal plane during jacking and movement, there may be provided at the rear wall 142 of the platform guide plates and cam and cam-follower arrangements. Shown in FIGS. 3 and 3B is the standard 91, a square vertical bar against which the cam followers 92 and 93 are in rolling contact. The cam followers are mounted on the guide plate 94 which is welded to the wall 142 of the platform. Also, a stop pin 95 protruding from the guide plate 94 limits backward tilting of the platform 32 by its contact with the standard 91 should that tilt become excessive.

FIG. 3A shows fragmentarily a corner of a side wall of the enclosure. Inserted in that wall is a photoelectric cell 62 on which a beam of light indicated at 64 impinges. The photoelectric cell is connected in circuit with a switch controlling the hydraulic circuit. When the platform 32 descends to a point where it interrupts the beam 64, action is cut off and the platform discontinues further downward travel. The beam may also be interrupted, of course, by other obstructions to achieve the same cessation of platform travel.

Reverting to the cantilever support and chain drive of the present invention, it may be seen that a three-point guide system is utilized. In FIG. 3, the relative thicknesses of the side walls 14 and 16 compared to that of the rear wall 20 is apparent. In the compartment formed by the panels 22 and 24 of the rear wall, the hydraulic drive system of the apparatus is disposed as noted in connection with FIG. 1. Also shown in FIG. 3 is the central slot 72 formed in the panel 24 and through which the cantilever support 116 extends to the platform 32. Parallel guide slots 74 and 76 also formed in the panel 24 accommodate slide blocks (not shown) which aid in maintaining the platform 32 level at all times in its travel.

What has been shown and described is a preferred embodiment of the invention. However, the breadth of the invention should be limited only by the spirit and scope of the appended claims.

What is claimed is:

1. Pallet loading apparatus for positioning palletized loads at heights convenient for manual loading and unloading comprising an open-topped, three-sided enclosure having two relatively thin side walls joined at two of their opposing ends by a relatively thick end wall, said end wall including interior and exterior parallel panel members joined to form a housing, a lift cradle for holding a pallet disposed within said three-sided enclosure for predetermined vertical movement therein, a hydraulic lift system including a chain hoist disposed within said housing, said interior panel of said housing having at least one vertical slot formed therethrough, means extending from said chain hoist through said vertical slot to said lift cradle and providing cantilever support thereto, and switch means operative upon said hydraulic system to control the flow of fluid therein whereby said lift cradle may be positioned vertically at desired points within said enclosure.

2. Pallet loading apparatus as defined in claim 1 wherein said hydraulic system includes a hydraulic cylinder having a piston vertically reciprocable therein, and a sheave mounted for rotation on the end of said piston, said chain hoist including a chain passing over said sheave having one end connected to said means extending through said vertical slot to said lift cradle and an opposite end anchored to said housing.

3. Pallet loading apparatus as defined in claim 2, wherein said switch means includes a switch operable manually and by photoelectric means.

4. Pallet loading apparatus as defined in claim 3, wherein said photoelectric means includes a light source and a photoelectric cell disposed in juxtaposition at a relatively low level adjacent the bottom and across the open end of said three-sided enclosure, a normally uninterrupted light beam passing between said light source and said photoelectric cell, interruption thereof by said platform or the foot of said operator disabling vertical movement of said platform.

5. Pallet loading apparatus as defined in claim 1 and further including a pair of insertable pins, said lift cradle including a platform having side members, each said side member having an opening formed horizontally therethrough, each said side wall of said enclosure having a corresponding opening formed therethrough whereby each of said insertable pins may be passed through one of said openings in said side wall of said enclosure and its corresponding opening in said side member of said lift cradle to lock said platform at a predetermined height relative to said enclosure to permit the insertion of a pallet beneath said platform.

* * * * *